(12) United States Patent
Masuda et al.

(10) Patent No.: US 6,314,578 B1
(45) Date of Patent: Nov. 13, 2001

(54) CHILD PROTECTING CLOTHES FOR VEHICLES

(75) Inventors: Mitsunori Masuda; Taku Yamamoto, both of Tokyo (JP)

(73) Assignee: Zenkoku Bousai Jigyo Kyogyo Kumiai, Fukui-ken (JP); a part interest ( * ) Notice: Subject to any disclaimer, the term of this patent is extended or adjusted under 35 U.S.C. 154(b) by 0 days.

(21) Appl. No.: 09/622,370

(22) PCT Filed: Dec. 17, 1999

(86) PCT No.: PCT/JP99/07113

§ 371 Date: Aug. 16, 2000

§ 102(e) Date: Aug. 16, 2000

(87) PCT Pub. No.: WO00/69291

PCT Pub. Date: Nov. 23, 2000

(30) Foreign Application Priority Data

May 13, 1999 (JP) ................................. 11-168716
Nov. 1, 1999 (JP) ................................. 11-311378

(51) Int. Cl.⁷ .................................................. B60R 21/00
(52) U.S. Cl. .............................................. 2/102; 297/465
(58) Field of Search ................................. 2/463, 102, 69, 2/456, 108, 327, 44, 45, 92, 94; 280/801.1, 803, 804, 808; 297/465, 464, 483–486, 468; 182/3–6

(56) References Cited

U.S. PATENT DOCUMENTS

| 1,616,349 | * | 2/1927 | Cagle | 2/102 |
| 2,908,324 | * | 10/1959 | Muller et al. | 2/102 |
| 3,524,679 | * | 8/1970 | Lavenne | 2/102 |
| 3,827,716 | * | 8/1974 | Vaugh et al. | 280/150 AB |
| 3,992,040 | * | 11/1976 | Gannac | 280/744 |
| 4,759,569 | * | 7/1988 | Potter | 280/748 |
| 4,848,793 | * | 7/1989 | Huspen et al. | 280/801 |
| 5,161,258 | * | 11/1992 | Coltrain | 2/102 |
| 5,429,418 | * | 7/1995 | Lipper et al. | 297/465 |
| 6,035,440 | * | 3/2000 | Woodyard | 2/102 |

FOREIGN PATENT DOCUMENTS 51-10725  1/1976  (JP) .
63-85609  6/1988  (JP) .

\* cited by examiner

Primary Examiner—Gloria M. Hale
Assistant Examiner—Tejash Patel
(74) Attorney, Agent, or Firm—Clark & Brody

(57) ABSTRACT

The present invention relates to child protecting clothes for vehicles, used with a seat belt so as to protect a child sitting on a seat of an automobile from a shock of an accident. As compared with a related art child seat, the child protecting clothes have the following advantages. The protective clothes can be put on a child as the safety of the child is secured; manufactured at a low cost; and give the person wearing the clothes a certain degree of freedom of physical movement. A back member 10B of the protective clothes is formed double of an inner cloth portion 10B1 and an outer cloth portion 10B2. A seatbelt C can be inserted between the inner and outer cloth portions 10B1, 10B2 of the back member.

13 Claims, 10 Drawing Sheets

CHILD PROTECTING CLOTHES FOR VEHICLES

TECHNICAL FIELD

This invention relates to child protecting clothes for vehicles, used with a seatbelt so as to protect a child sitting on a seat of an automobile from a shock of an accident.

BACKGROUND OF THE INVENTION

In an automobile, various kinds of safety devices for protecting the bodies of occupants are provided on the assumption that the collision of the automobile will occur. A current automobile is provided without exception with, for example, a three-point support type seatbelt for binding a human body on a seat of the automobile.

This three-point support type seat belt is passed around the waist and breast of a seated person to prevent his body from flying out when the automobile collides with something.

To be exact, in the case of a driver's seat (in a right-hand drive vehicle), a driver in a seated state grasps a leader portion of a seatbelt, which is provided in a looped state on the right side of the driver's seat, with a hook, and passes the seatbelt and hook from the right shoulder toward a diagonally left lower portion of the body of the driver via the breast of him, the hook on the seatbelt being then fitted firmly in a lock member provided on the portion of the seat which is close to the left thigh of the driver. Thus, the continuously extending seatbelt is used to hold the upper half of the body of the driver in a shoulder-bound state, and also an abdominal region of the driver substantially straight in a horizontal direction by a lower portion of the seatbelt. When impact acceleration of a traffic accident and the like is sensed, a seatbelt draw-out action is stopped, and a movement in the interior of the vehicle of the body of the driver is prevented.

This seat belt is provided usually on the basis of a case where it is put on a person having a sitting height of substantially not smaller than 50 cm.

When this seatbelt is put on a person who is up to such standards, the upper half of the person is held in a shoulder-bound state by the seatbelt passed from the left (right) shoulder toward a diagonally right (left) lower portion of the body of the person via his breast, and the waist of the person can be secured safely at once.

However, in the case of a child having a small sitting height, the seatbelt holding the upper half of the body of him by passing the same from the left (right) shoulder toward the diagonally right (left) lower portion of the body of the child via the breast of him passes just the neck portion of the child in a shoulder-binding state.

Therefore, when a traffic accident occurs, a so-called neck-wringing phenomenon occurs, and the seatbelt which originally gives safety to a person involves a risk of being turned into a tool for hurting a child. Moreover, when the seatbelt is put on a child forcibly, a free movement of him is prevented.

Under the circumstances, a child seat has been developed as equipment for a child which is used in place of the seatbelt.

A child seat usually includes an auxiliary seat provided with a seat back for having a child (especially, an infant) sit on the seat stably, an auxiliary seatbelt for holding the seated child, and a releasing device for undoing a lock of this seatbelt by one pressing operation in case of emergency.

The child seat is formed so that it can be fixed to a seat of an automobile by using a seatbelt.

In the child seat of the above-described construction, a drawback encountered in a case where a seatbelt mentioned above and originally provided in an automobile is put directly on a child, i.e. a danger of the occurrence of a neck wringing phenomenon and the like is substantially eliminated. On the other hand, when the child seat is set in an automobile, the body of a child is held in a shut-up state in a narrowly demarcated space by a material of a comparatively high rigidity, so that a free action of the child is mostly hampered. Moreover, since the child seat itself is formed strongly, it does not fit the body of a child very well. Moreover, the drawback to the child seat of receiving a force locally and collectively due to the auxiliary seat belt when the collision of the automobile occurs has also been pointed out.

Above all, fixing and removing the child seat to and from a seat of an automobile takes much time, and the child seat is of great bulk. Moreover, the child seat cannot be transported in a folded state.

In addition, a high price is also one of the drawbacks to the child seat.

The shape of the child seat is restricted because of the limited shape of the seat of an automobile, so that the child seat lacks convenience.

The present invention has been developed in view of such technical problems.

The present invention provides a safe protective member interposed between a child sitting on a seat of an automobile and the same seat, and adapted to secure the safety of the child when an accident of collision of the automobile occurs, and more particularly child protecting clothes for vehicles, interposed between a child sitting on a seat of an automobile and the same seat, capable of securing the safety of the child when an accident of collision of the automobile occurs, inexpensive and comfortable to wear, and capable of securing a high degree of freedom of action of the child.

DISCLOSURE OF THE INVENTION

The present invention has been made in view of the circumstances described above.

Namely, according to an aspect of the present invention, the children's clothes for vehicles to be put on a child sitting directly on a seat of an automobile are characterized in that a back member of the protective clothes is formed double and includes inner and outer cloth portions, between which a seatbelt can be inserted.

The inner and outer cloth portions of the back member are made connectable or separable at their lower end portions, and the connection or separation of the inner and outer cloth portions is carried out by inserting or removing a string member into or from both of these cloth portions.

In the case of child clothes for a comparatively grown child of around 6–7 years, the back member as a whole may be formed double but the back member of child clothes for a child of 3–4 years is preferably provided at a lower half section only thereof with a double part which permits a seat belt to be inserted therethrough, and which is formed of inner and outer cloth portions.

According to another aspect of the present invention, the child protecting clothes for vehicles, which are put on a child sitting on a seat of an automobile via a child seat has a slit through which a seatbelt is inserted, a back member of the protective clothes being formed double and including inner and outer cloth portions, the seatbelt being made able to be inserted through a space between the inner and outer cloth portions of the back member via the slit. The child seat referred to in this paragraph is a mat-like material interposed between a child wearing the protective clothes and the seat of the automobile.

According to still another aspect of the present invention, the child protecting clothes for vehicles has a front member, and a back member formed of inner and outer cloth portions, between which a space through which a seatbelt can be inserted is given, characterized in that clips constituting another feature of the invention are provided which are adapted to clamp the seatbelt with a predetermined level of force when the seatbelt has been passed correctly through a space between the inner and outer cloth portions and set properly. Owing to such an arrangement, a person outside of the automobile can ascertain that a child correctly wearing the child protecting clothes for vehicles wears the clothes correctly and sits in a correct position, and a secondary accident, which occurs when the child seat is set in an incorrect position, can be avoided.

Especially, it is preferable that each of these clips be formed of a support member, and an elastic pressure member, which is adapted to be moved as it elastically clicks the portion of the seat belt which is between two positions thereon, and that the support member and elastic pressure member be provided at their respective free end portions with magic tapes.

According to a further aspect of the present invention, the child protecting clothes for vehicles has an outer cloth portion formed on a lower section only of a back member so that a seatbelt inserting part is formed on the lower section of the back member. In this case, a partition belt is sewn on an upper edge section of the outer cloth portion, and continues to be sewn round on a front member.

According to another aspect of the present invention, the child protecting clothes for vehicles are provided with two vertical belts attached to the region of the child protecting clothes which extends from a waist section of a front member to a waist section of an outer cloth portion of a back member via two upper shoulders of the child protecting clothes, a detachable length regulatable waist belt extending horizontally around a waist section of the front member and the waist section of the outer cloth portion of the back member, and a pair of length regulatable crotch belts which are fixed at one end portion of each thereof to a lower section of the front member, and at the other end portion of each thereof to a lower section of the back member, and which permit the legs of a child who wears the child protecting clothes to be inserted thereinto. In the child protecting clothes, it is preferable that height regulators capable of regulating the length of the child protecting clothes be provided directly or indirectly on the portions of vertical reinforcing belts which correspond to upper portions of the front member.

Furthermore, each of the crotch belts has a belt type pad member additionally provided thereon in an inserted state via slits formed in the pad member. The belt type pad member is provided at one end portion thereof with projecting members extending in two laterally opposite directions, and the projecting members are folded onto a buckle to hold the buckle in a buckle-enclosing state.

BRIEF DESCRIPTION OF THE DRAWINGS

FIG. 12 illustrates a clip, wherein:

FIG. 12A shows the clip in a closed state;

FIG. 12B shows the clip in an opened state;

FIG. 12C is a front view of the clip; and

FIG. 12D is a partial enlarged view with magic tapes attached to the clip;

BEST MODE FOR CARRYING OUT THE INVENTION

An embodiment of the seatbelt-attachable children's clothes for vehicles according to the present invention will now be described in detail.

Figure 1:
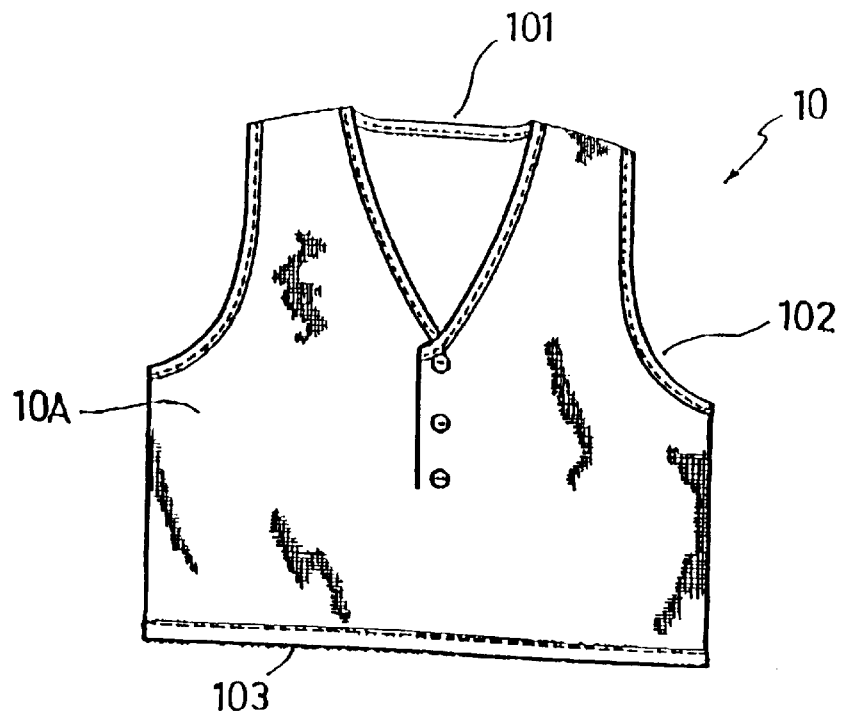
FIG. 1 illustrates a front surface portion of child protecting clothes for vehicles.
Figure 2:
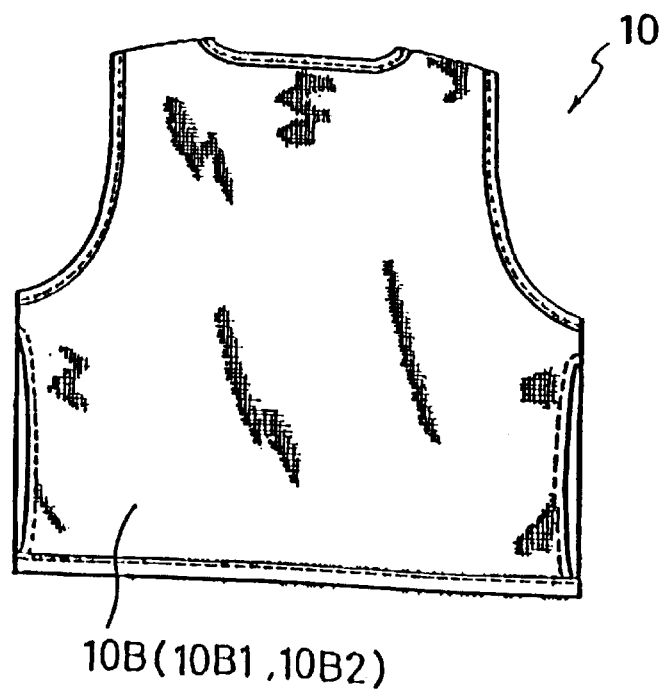
FIG. 2 illustrates a rear surface portion of the child protecting clothes for vehicles shown in FIG. 1.
Figure 3:
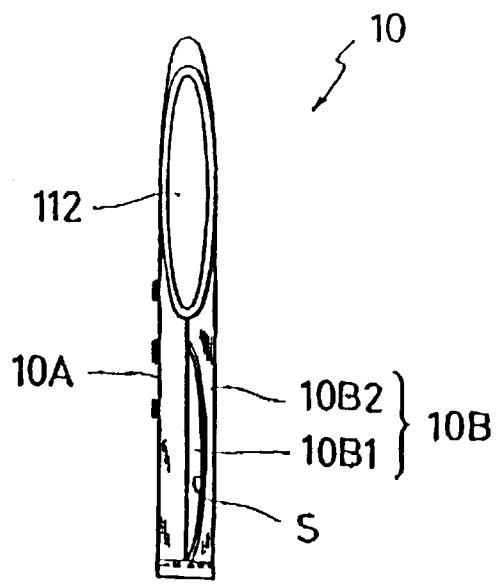
FIG. 3 illustrates the construction in side elevation of the child protecting clothes for vehicles shown in FIGS. 1 and 2.

Regarding a description to be given of the child protecting clothes for vehicles according to the present invention, FIGS. 1, 2 and 3 illustrates an example of vest type child protecting clothes for vehicles.

The child protecting clothes for vehicles 10 are fixed to a seat A of an automobile directly or indirectly (i.e., via a child seat 1), and thereby play the role thereof.

The child protecting clothes for vehicles 10 are made of a cloth material of natural fiber, synthetic fiber, etc. so that the clothes fit the body of a child. These clothes usually have a shape similar to that of a vest, and are formed so as to enclose the upper half of the body with a front member (front body portion) 10A and a back member (rear body portion) 10B, the clothes including a head passing portion 101, arm passing portions 102 and a body passing portion 103. This kind of child protecting clothes include vest type clothes as well as sleeve-carrying clothes, clothes with trousers or skirt joined to a lower portion thereof, or tank top type clothes, etc.

Especially, the back member 10B is formed double of an inner cloth portion 10B1 and an outer cloth portion 10B2, between which a seatbelt C can be passed.

Namely, since a space exists between the inner and outer cloth portions 10B1, 10B2, the seatbelt C can be passed therethrough when a child wearing the child protecting clothes for vehicles is held on a seat A.

The back member 10B can be provided with such a limited opening S as is shown in FIG. 3, by forming a sewn region between the inner and outer cloth portions 10B1, 10B2. The seatbelt C can be passed in the back member 10B in predetermined positional relation therewith through the openings S.

In order to ensure the strength of the child protecting clothes for vehicles 10, it is preferable various kinds of reinforcing members are provided.

The child protecting clothes for vehicles 10 shown in the drawings have been described as pullover type clothes. The child protecting clothes for vehicles may, of course, be formed of front side-opened type clothes, and are not specially limited to the above-described embodiment.

Method 1 of Using the Clothes

In order to use the seatbelt-attachable child protecting clothes for vehicles according to the present invention, the child protecting clothes for vehicles 10 are put on a child B first.

In order to put the pullover type child protecting clothes for vehicles 10 shown in FIGS. 1 and 2, on the child B, the head may be inserted therethrough from a body passing portion 103 of the clothes 10.

A child seat 1 with a cover put thereon is then placed on a seat A of an automobile.

The placing of the child seat 1 on the seat A is done by resting a back 50 of the former 1 against that of the latter A.

A clasp CI of the seatbelt C is passed in advance through one slit 5 out of the two 5, 5 of the back 50 of the child seat 1. The child B wearing the child protecting clothes for vehicles 10 is then placed in front of the child seat 1.

The clasp CI, which has been passed through the above-mentioned slit, of the seatbelt C is drawn out, and the seatbelt C is passed through the back member 10B via a closed portion S formed by the inner and outer cloth portions 10B1, 10B2 of the back member 10B of the child protecting clothes for vehicles 10.

Finally, the clasp CI of the seatbelt C is passed through the other slit 5 of the child seat 1, and fixed to the other clasp C2 of the seat A.

Figure 7:
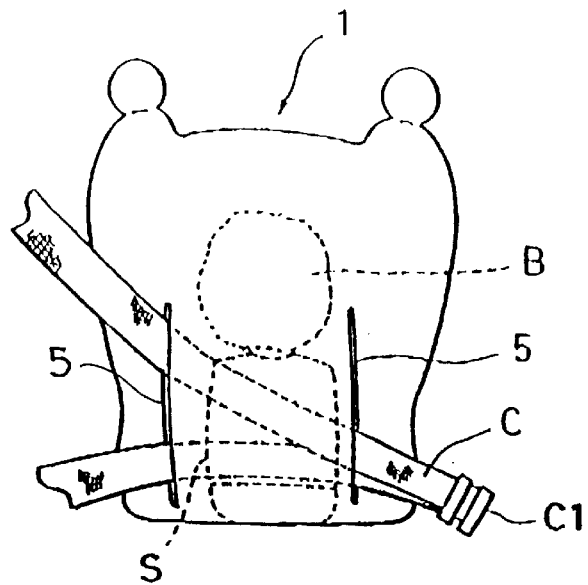
FIG. 7 is a rear view illustrating the condition of use of child protecting clothes for vehicles, i.e. a child wearing the same clothes and sitting on a slit-carrying child seat.
Figure 8:
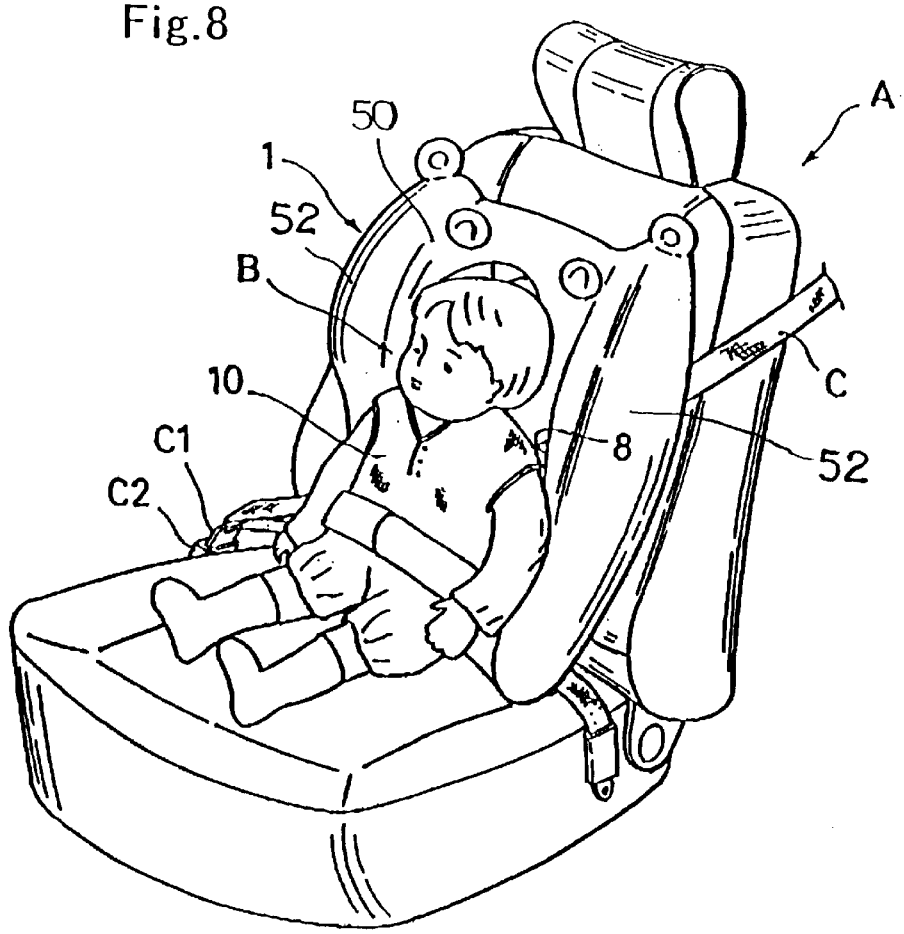
FIG. 8 illustrates in perspective the condition of the child seat of FIG. 7 set on the seat of a vehicle.

After all, belt members 7 provided on a front lower portion of a cover are combined with each other in a position in front of the waist of the child B to complete all the procedure. Consequently, the child B wearing the child protecting clothes for vehicles 10 is held safely on the seat A (refer to FIGS. 7 and 8).

Namely, owing to the seatbelt-attachable child seat 1 and child protecting clothes for vehicles 10 employed in the present invention, the child B wearing the clothes 10 and sitting on the seat A is held firmly as the child seat 1 and child protecting clothes for vehicles 10 are united in one body by the child seat 1 and the seatbelt C inserted through the slits 5, 5 provided in the child seat 1 and the closed portion S formed by the inner and outer cloth portions 12A, 12B of the back member 10B of the vest body 11.

The child protecting clothes for vehicles 10 have excellent wearing comfort as compared with related art clothes of this kind which are adapted to secure an upper half of a child B sitting on a seat A, by pressing the upper half of the child B by a seatbelt tightened in a shoulder-passing state, and the former clothes do not impart a local force to the upper half of the child.

Especially, the back 50, and swollen portions 52, 52, which are provided vertically at left and right sections of the back 50, of the child seat 1 employed in the present invention are molded into a hollow part-carrying body. This child seat is swollen by injecting the air at a predetermined flow rate into these hollows via a valve. Accordingly, an external force applied to the body of a child when a collision accident occurs is absorbed sufficiently owing to an effect of an air cushion.

A swollen section of the portion of the child seat which the head of the child B contacts can effectively absorb an impact imparted thereto when a rear-end collision occurs, so that the safety of the child seat with respect to the child B increases to a very high level.

Even in an emergency, the clasp CI of the seatbelt C may only be released, and the child B with the child seat 1 can be taken out of the vehicle with the child B with the child seat 1 held in the arms of a parent. Therefore, these operations can be done very speedily and easily.

The seatbelt C passes a rear portion of the child protecting clothes for vehicles 10. Therefore, when a collision accident occurs, an impact force is damped in a wide region of the front member (i.e. front body portion) 10A of the child protecting clothes for vehicles 10 via the seatbelt C, so that a local force is not imparted to the clothes 10.

Method 2 of Using the Clothes

A method of using the child protecting clothes for vehicles according to the present invention without using the seatbelt-attachable child seat 1 employed in the present invention will now be described.

First, the children's clothes for vehicles 10 are put on a child B. The child wearing the children's clothes for vehicles 10 is then placed in a position in front of the child seat 1. The seatbelt C, which has been passed through the slit 5 in advance, is inserted through the back member 10B via the opening S formed by 10B2 of the seatbelt C.

The clasp C1 of the seatbelt C is passed through the remaining slit 5 of the child seat 1, and fixed to the other clasp C2 of the seat A.

Figure 9:
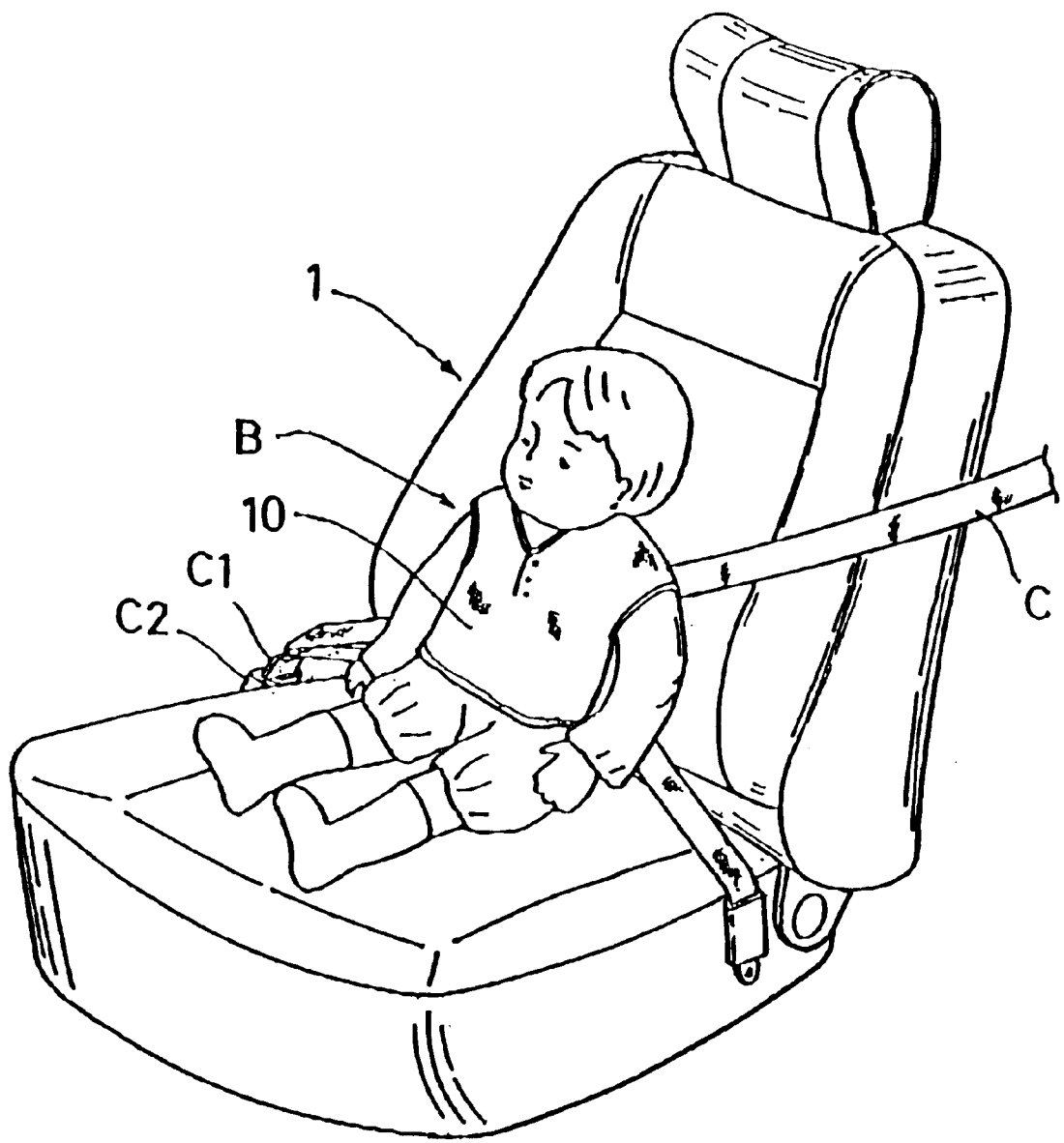
FIG. 9 illustrates in perspective the condition of a child, who wears child protecting clothes for vehicles, set on a seat of a vehicle without using a child seat.

Consequently, the child B wearing the child protecting clothes for vehicles 10 is held stably on the seat without using the child seat 1 (refer to FIG. 9).

Other Child Protecting Clothes for Vehicles

This example of the child protecting clothes for vehicles 10 are clothes made by further adding convenience to the above-described child protecting clothes for vehicles.

Figure 4:
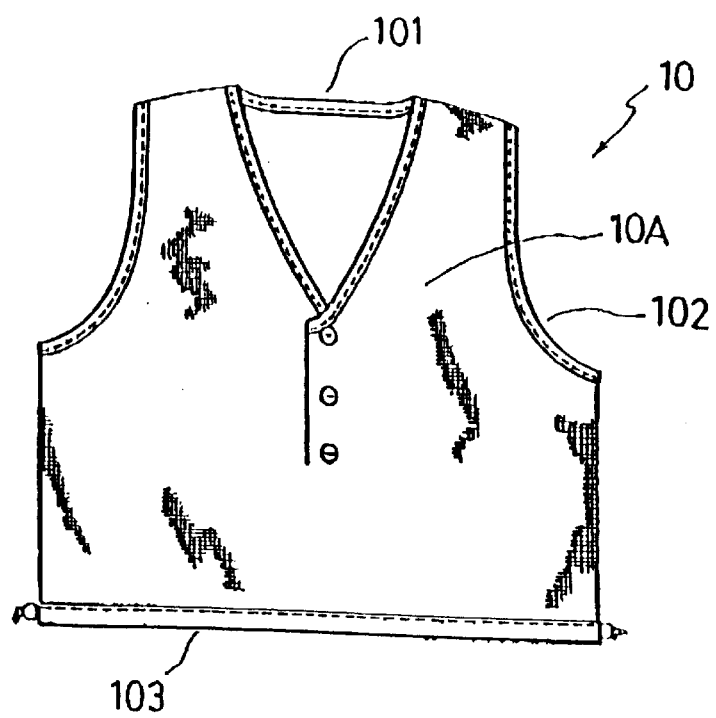
FIG. 4 illustrates a front surface portion of another child protecting clothes for vehicles.
Figure 5:
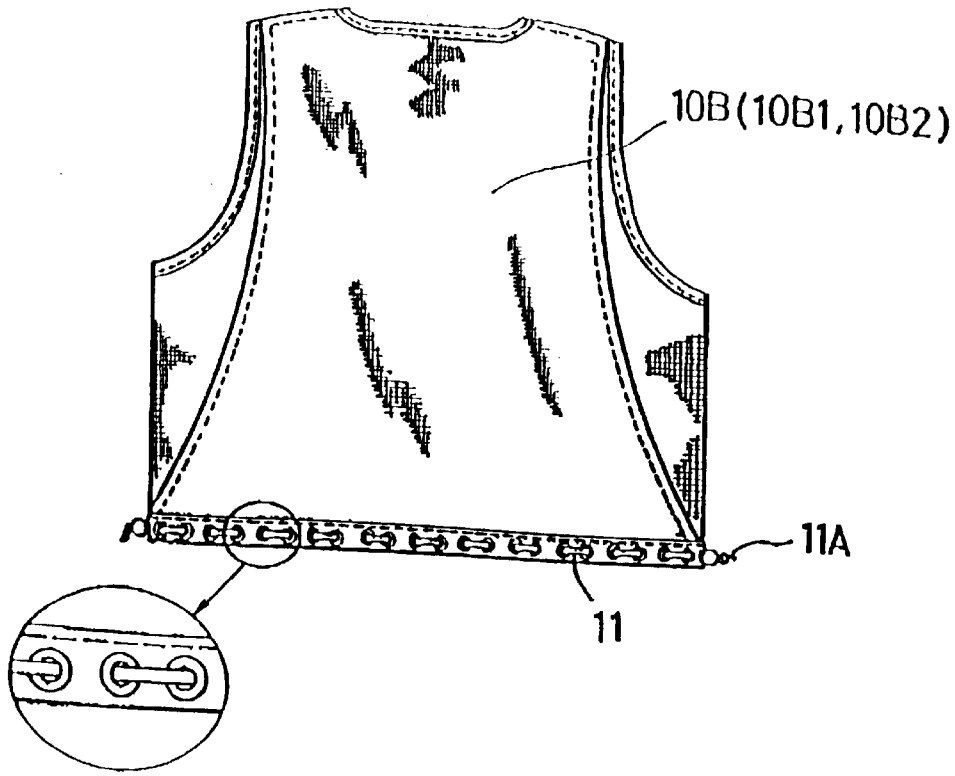
FIG. 5 illustrates a rear surface portion of the child protecting clothes for vehicles shown in FIG. 4.
Figure 6:
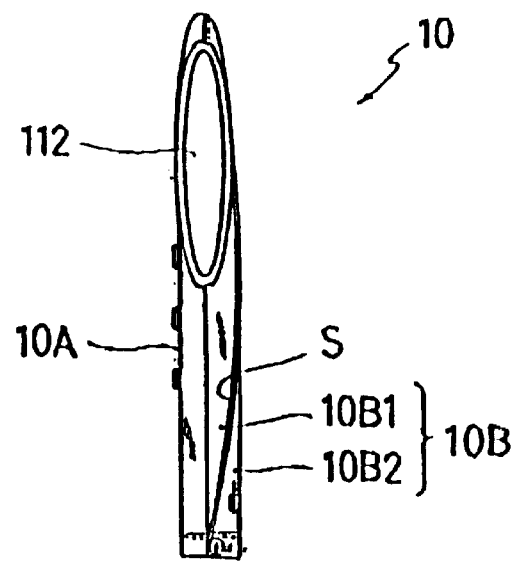
FIG. 6 illustrates the construction in side elevation of the child protecting clothes for vehicles shown in FIGS. 4 and 5.

A back member 10B of the child protecting clothes for vehicles 10 shown in FIGS. 4, 5 and 6 are also formed double of an inner cloth portion 10B1 and an outer cloth portion 10B2, and a seatbelt C can be inserted through an opening S formed by these inner and outer cloth portions. The opening S provided in this example is formed larger than that S formed in the children's clothes for vehicles 10 shown in FIG. 3, and a position from which the seatbelt C is inserted in the example of FIGS. 4, 5 and 6 has a degree of freedom of selection.

When a clasp of the seatbelt C gets out of order at the time of occurrence of an accident, there is the possibility that the child and child seat cannot escape from the seat A. The child protecting clothes for vehicles 10 in this example are formed so that the clothes can deal with such a case, and characterized in that the inner and outer cloth portions 10B1, 10B2 of the back member 10B can be joined to or separated from each other at the lower end sections thereof.

Namely, a string member 11 is inserted through both the inner and outer cloth portions 10B1, 10B2 in advance, and removed in an emergency. In such a case, the child is separated from the seat A or child seat 1 simply, and taken away from the interior of the vehicle with ease.

To be exact, a large knot 11A is provided at an end portion of the string member 11, and it is recommended that the large knot 11A be formed so that it is loosened when it is pulled.

The inner and outer cloth portions 10B1, 10B2 may also be formed so that they can be opened and closed freely by a zipper.

The present invention has been described above. The present invention is not limited to these modes of embodiments. Various types of modified examples can be included in the present invention as long as they do not depart the gist of the present invention.

For example, when the children's clothes for vehicles 10 are used directly for the seat A without using the child seat 1, the clothes can, of course, be used as clothes for adults.

Figure 10:
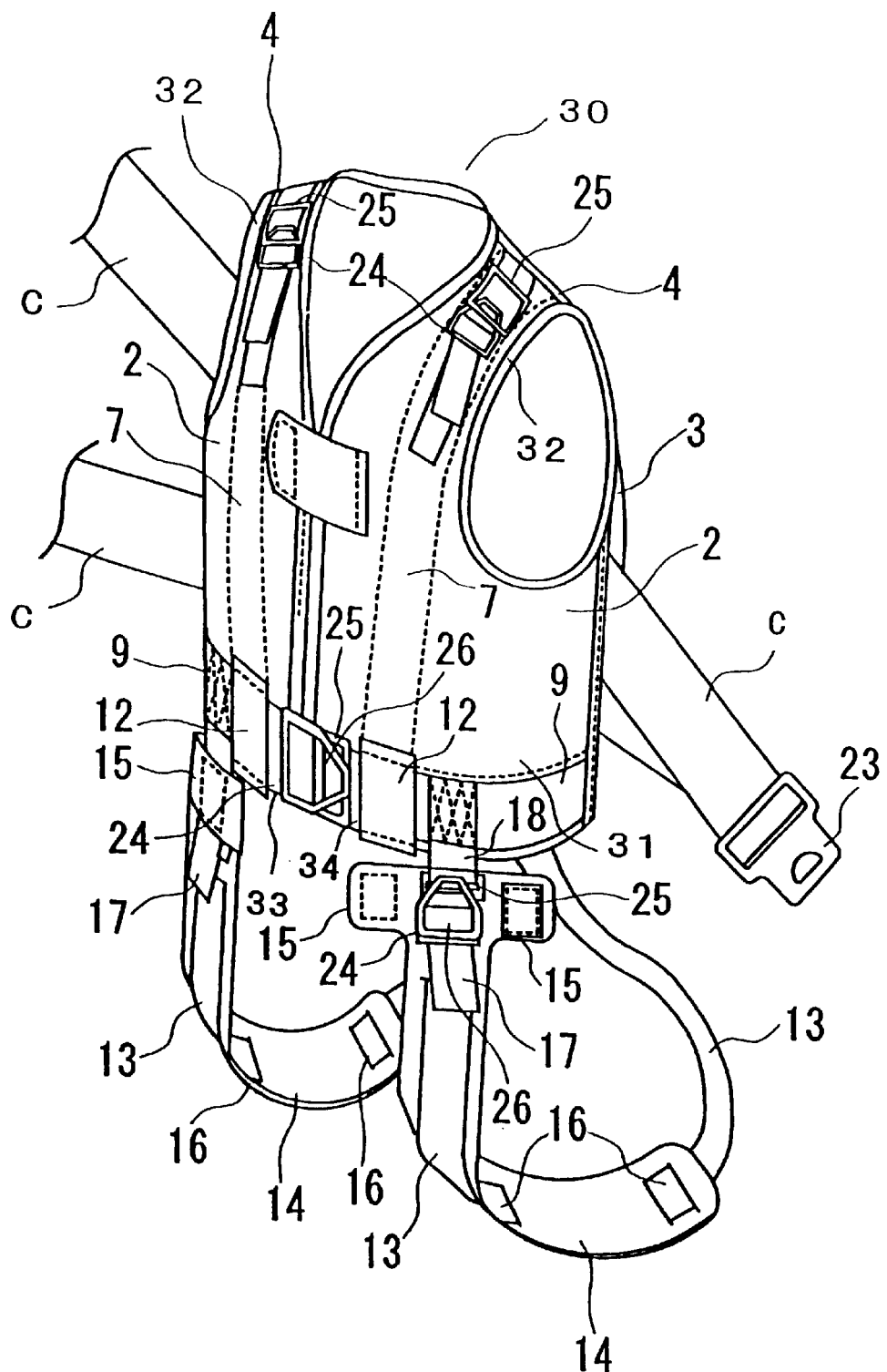
FIG. 10 is a frontal perspective view of another embodiment of the child protecting clothes for vehicles.
Figure 11:
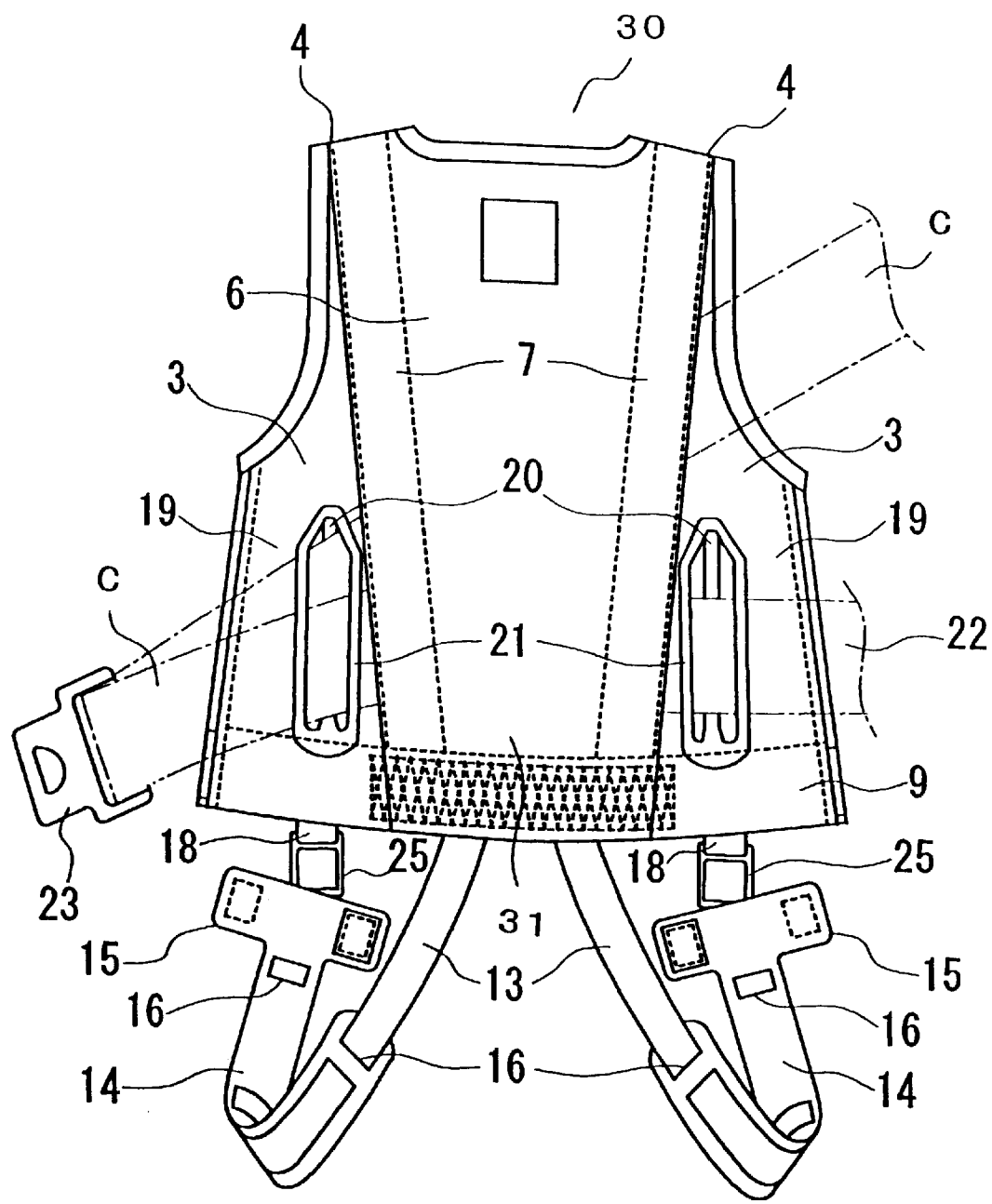
FIG. 11 is a rear view of the same child protecting clothes for vehicles.

When the child protecting clothes are not correctly put on a child, the body of the child cannot be protected thereby when a traffic accident occurs. Therefore, it is important that a parent can visually ascertain that the child protecting clothes for vehicles are put on a child correctly, and child protecting clothes for vehicles meeting this important requirement will now be described with reference to the drawings. FIG. 10 is a frontal perspective view of child protecting clothes for vehicles according to the present invention, and FIG. 11 a rear view of the same child protecting clothes for vehicles.

A reference numeral 30 denotes a vest, an example of the child protecting clothes for vehicles, 10A a front member (front body portion) of the vest 1, and 10B a back member (rear body portion) thereof.

The back member 10B is formed of an inner cloth portion 10B1 and an outer cloth portion 10B2, and the outer cloth portion 10B1 fixed to shoulder portions 4 and a waist portion 31 is superposed on the inner cloth portion 10B1, a seatbelt C being passed between the inner and outer cloth portions 10B1, 10B2.

A reference numeral 7 denotes vertical reinforcing belts extending from the waist section 31 of the outer cloth portion 10B2 to a waist portion 31 of the front member 10A round the shoulder portions 4, and turning at this waist portion 31 of the front member 10A into ring-shaped guides 12. These guides 12 are fixed to the waist portion 31 of the front member 10A, and a waist belt 9 is passed through the interior of the guides 12. Stature regulating units 32 having engageable and disengageable locking members (male) 24 and engageable and disengageable locking members (female) 25 which are capable of regulating the length of belts passed therethrough are provided on the portions of the vertical reinforcing belts 7 which are on the front member 10A and correspond to upper portions of the vertical reinforcing belts 7.

A reference numeral 9 denotes the waist belt fixed to the back member 10B and outer cloth portion B2, extending around the waist portion 31, and engaged detachably at both end portions thereof with each other at a joint portion of the front member 10A by a buckle 26 formed of a locking member (male) 24 fixed to one end portion 33 of the waist belt and a locking member (female) 25 fixed to the other end portion 34 thereof. The length of the waist belt 9 is set regulatable.

Reference numeral 13 denotes crotch belts joined at one end portion of each thereof to the waist portion 31 of the front member 10A, and at the other end portion of each thereof to the waist portion 31 of the back member 10B. The crotch belts 13 are engaged detachably with the portions of the front member 10A which are near the waist portion 31 thereof by buckles 26 formed of locking members (male) 24 fixed to one end portion 17 of each of the crotch belts, and locking members (female) 25 fixed to the other end portion 18 of each thereof, and the length of the crotch belts 13 is also set regulatable.

Reference numeral 14 denotes pads additionally provided on the crotch belts 13 via slits 16, and projecting members 15, 15 provided on the pads 14 enclose and retain the buckles 26, which are formed of the locking members (male) 24 and locking members (female) 25, of the crotch belts 13.

A reference numeral 19 denotes clips provided on the back member 10B, and capable of clamping the seatbelt C by a predetermined level of force when the seatbelt C is passed and set correctly between the back member 10B and outer cloth portion 6.

Figure 12:
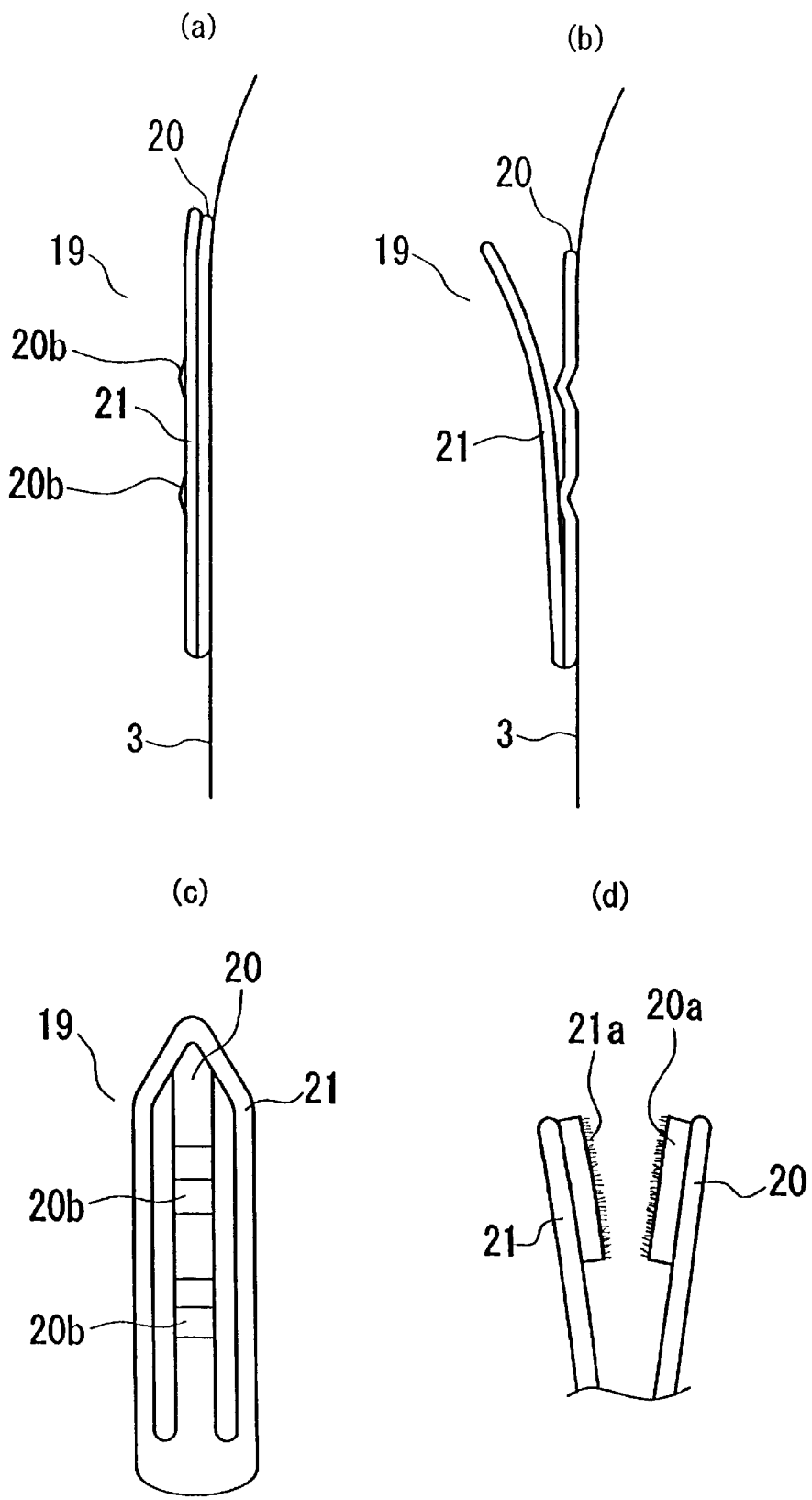

Each clip 19 is formed of a spring unit including a support member 20 and a resilient member 21. The clip is adapted to be moved between two positions, i.e. an opened position and a pressing position, and the resilient member 21 is opened resiliently when a force larger than necessary is exerted on the clip, to cause the seatbelt C to be released from the clip 19. FIG. 12D shows the condition of the support member 20 and resilient member 21 to free end portions of which magic tapes 20A, 21A are fixed so as to secure a clamping operation of the clip 19.

The support member 20 is provided with projections 20b, which prevent a movement of the seatbelt C while the seatbelt C is clamped.

Figure 13:
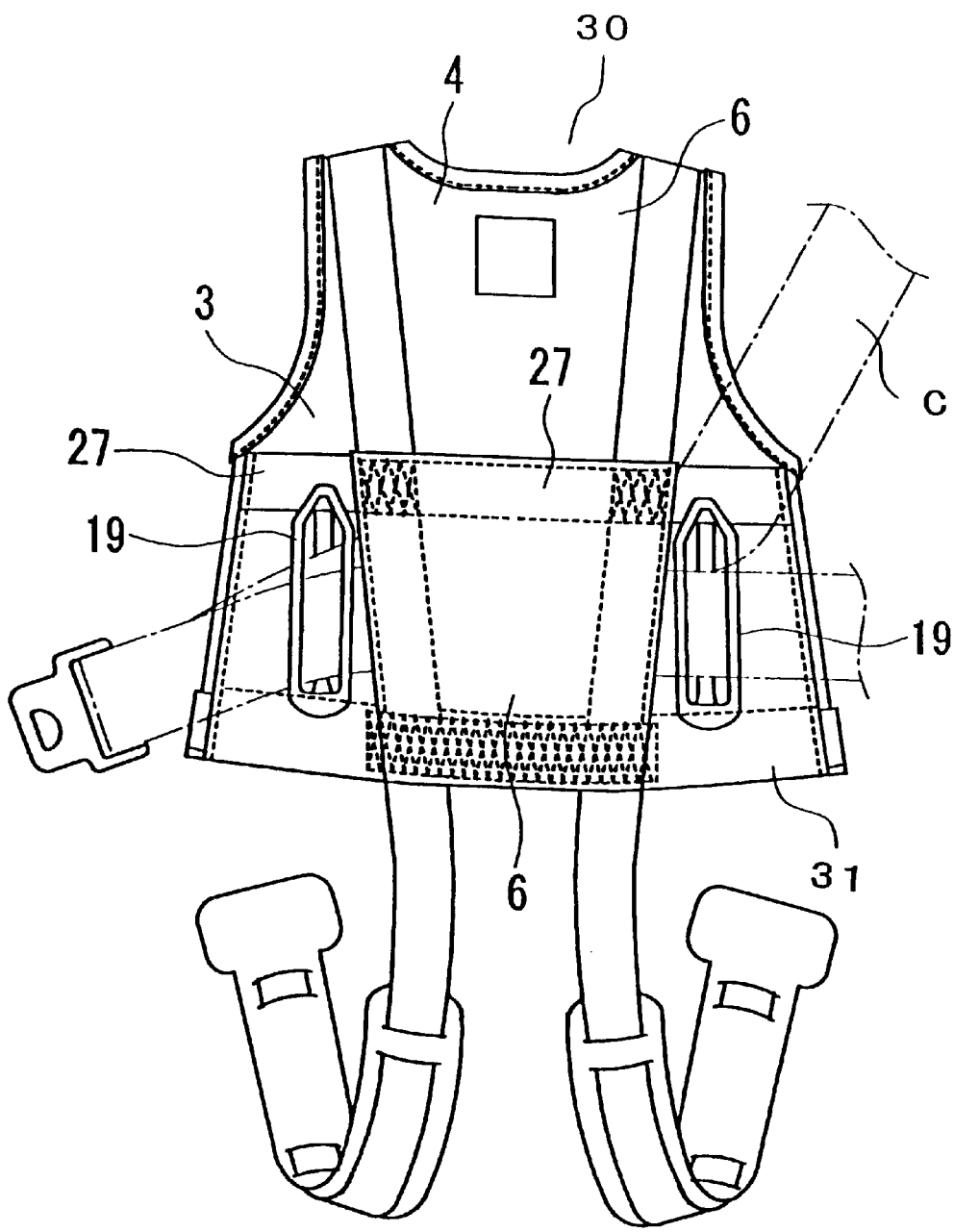
FIG. 13 is a rear view of still another embodiment of the child protecting clothes for vehicles.
Figure 14:
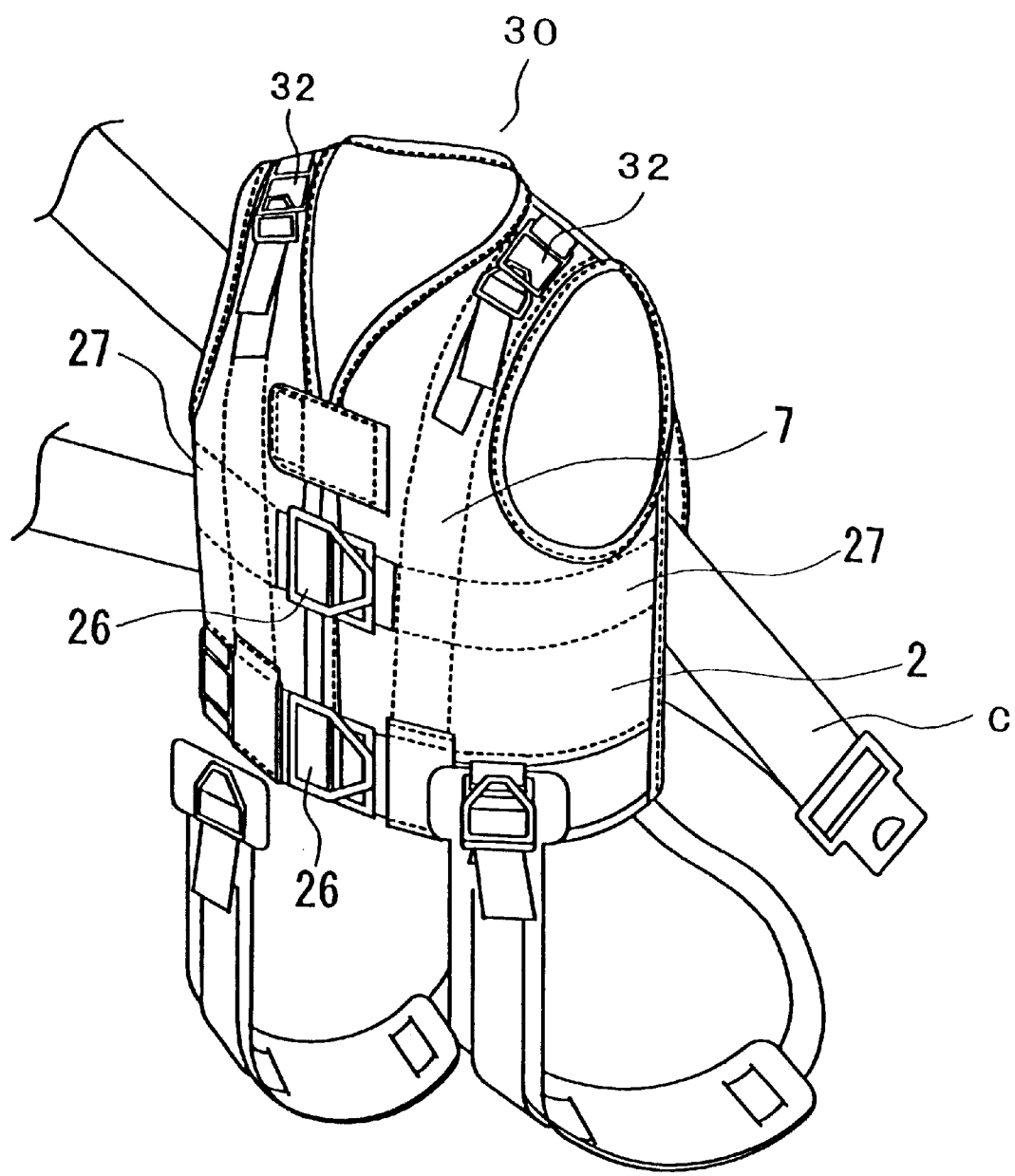
FIG. 14 is a frontal perspective view of a further embodiment of the child protecting clothes for vehicles.

FIG. 13 shows the condition of a partition belt 27 provided horizontally on central portions of the back member 10B and outer cloth portion 6 so as to pass the seatbelt C through a lower passage between the back member 10B and outer cloth portion 6, the partition belt 27 being sewn on an upper edge portion of the lower passage. The buckle 26 is provided on the front side-openable front member 10A. As shown in FIG. 14, the partition belt 27 is turned round to the front member 10A, and regulatably fastened by the buckle 26 on a breast portion of the clothes. The clips 19 are positioned on the portions of the back member which correspond to both sides of the lower passage.

The child protecting clothes for vehicles according to the present invention are formed as described above. Therefore, in order to have a child seated in a vehicle, the child protecting clothes for vehicles are put on the child, and the height of the clothes is then regulated in accordance with the height of the body of the child by a height regulating device. The waist belt is tightened so as to fix the waist portion of the child to a body of the clothes for vehicles. The crotch belts are tightened to hold firmly the clothes for vehicles on the portion of the child which is between the shoulders and crotch.

A seatbelt is then passed between the back member and outer cloth portion, and a slidably supported metal lock on the seatbelt is engaged with the female metal lock fixed to the seat or a vehicle body. The seatbelt is clamped by the clips.

Consequently, the person wearing the clothes for vehicles is set on the seat of the vehicle, and the seatbelt can be ascertained whether it is passed correctly between the back member and outer cloth portion and set properly, by examining the clips as to whether they can clamp the seatbelt.

The person wearing the clothes for vehicles is joined to the seat by the seat belt engaged with the back member to which the vertical reinforcing belts are fixed. When an impact due to an accident occurring to the vehicle is imparted to the person wearing the protective clothes, the seatbelt is locked to prevent the person from flying forward, owing to the back member to which the vertical reinforcing belts engaged with the seatbelt are fixed.

Owing to the crotch belts, the upward displacement of the safety clothes toward an upper portion of the body of the person is prevented, and, when a force larger than necessary is imparted to the clips, the seatbelt is released therefrom, so that the seatbelt firmly holds the back member alone to which the vertical reinforcing belts are fixed.

Namely, the seatbelt of the vehicle holds the safety clothes, and the safety clothes the person wearing the same, to thereby prevent the person from flying forward when an accident occurs.

EFFECT OF THE INVENTION

As has been described in detail above, the child protecting clothes 10 according to the present invention are a good fit, and give a considerable degree of freedom of movement of a child wearing the same. Especially, when a vehicle in which a child wearing the child protecting clothes for vehicles according to the present invention sits on a seat collides with a certain object, an inertial force for causing the person to fly forward is exerted on the same person but the seatbelt inserted between the back member and outer cloth portion engages the back member to which the shoulder belts are fixed, to prevent a movement of the child protecting clothes for vehicles which are connected thereto and a movement of the person wearing the same and connected thereto. Consequently, the person wearing the protective clothes does not fly out, and, since the front member as a whole of the protective clothes holds the person wearing the same clothes, the holding force is not concentrated on a part of the body of the person.

Since the back member 10B of the child protecting clothes for vehicles 10 is formed double of the inner and outer cloth portions 10B1, 10B2 with the seatbelt C made able to be inserted through a space between the inner and outer cloth portions 10B1, 10B2, the breast of a child wearing the clothes is not pressed even in a usual traveling condition. Accordingly, these clothes have wearing comfort.

When the inner and outer cloth portions 10B1, 10B2 of the back member 10B are joined together or formed separably at their respective lower end sections, the body of a child wearing the child protecting clothes for vehicles 10 is released easily from the clothes, child seat 1 or seat A in an emergency.

Moreover, owing to the clips provided on the back member, the correctness of the set condition of the seatbelt can be visually ascertained. Therefore, even when a child wearing the clothes is moved after the seatbelt has been set, as well as while the seatbelt is being set, the correctness of the present set condition of the seat belt can be ascertained easily. Especially, the clips each of which includes a support member and a resilient member, and each of which is moved resiliently between two positions, do not have a projecting portion, so that the clips do not give the child a sense of physical disorder when the clips are attached to the protective clothes. The clips are also safe for a child.

In addition, when a vehicle in which a child wearing the child protecting clothes for vehicles is seated collides with a certain object, an inertial force causing the child wearing the same clothes to fly out forward is exerted on the child. However, a seat belt passed through a space between the back member and outer cloth engages the back member to which the shoulder belts are fixed, to prevent the movements of the protective clothes joined thereto and the person wearing the protective clothes and joined to the same. Accordingly, the person wearing the clothes for vehicles does not fly out forward. Moreover, since the front member as a whole holds the person wearing the clothes for vehicles, the holding force is not concentrated on a part of the body of the person. This can prevent a secondary accident from occurring in the interior of the vehicle. Especially, when the outer cloth portion is formed on a lower section of the back member, allowance for a longitudinal movement of the user decreases, and the user is protected reliably when an impact is imparted to the user. When a partition belt is sewn on an upper edge section of the outer cloth portion, continuously extended round to the front member and tightened by a buckle on a breast portion of the protective clothes, an impact can be dealt with more reliably.

What is claimed is:

1. Child protection clothes for vehicles which a child sitting directly on a seat of an automobile wears, the child protecting clothes including a front member and a back member that together form a head opening and waist opening, characterized in that the back member of the child protecting clothes has a double layer portion comprising an inner cloth portion and an outer cloth portion, the inner and outer cloth portion forming a pair of openings adjacent distal ends of the back member with the openings extending generally vertically from adjacent the waist opening to either a midsection of the outer cloth portion or adjacent the head opening, the openings formed by the inner and outer cloth portions receives a seatbelt.

2. Child protecting clothes for vehicles according to claim 1, wherein the inner and outer cloth portions are formed connectably to or separably from each other at a lower end portion of the back member.

3. Child protecting clothes for vehicles according to claim 1, wherein the connection or separation of the inner and outer cloth portions is carried out by removing a string member inserted through both thereof.

4. Child protecting clothes for vehicles according to claim 1, mutually superposed sections between which the seatbelt can be inserted of the inner and outer cloth portions are formed on a lower half of the back member.

5. Child protecting clothes for vehicles according to claim 4, wherein a partition belt is sewn on an upper edge section of the outer cloth portion and continues to be sewn round on the front member.

6. Child protecting clothes for vehicles according to claim 1, wherein clips are provided which are adapted to clamp the seatbelt by a predetermined level of force when the seatbelt is inserted between the inner and outer cloth members correctly and set properly.

7. Child protecting clothes for vehicles according to claim 6, wherein each of the clips includes a support member and a resilient member, the resilient member being moved resiliently between two positions.

8. Child protecting clothes for vehicles according to claim 7, wherein each of the support members and resilient members is provided on a free end portion thereof with a magic tape.

9. Child protecting clothes for vehicles according to claim 1, wherein the clothes are provided with vertical reinforcing belts attached to the parts thereof which extend from a waist section of the front member to a waist section of the outer cloth portion of the back member; a detachably engageable length regulatable waist belt fixed to the front member and the waist section of the outer cloth portion of the back member; and two length regulatable crotch belts fixed at one end portion of each thereof to a lower portion of the front member, and at the other end portion of each thereof to a lower portion of the back member, and permitting legs of a person wearing the protective clothes to be inserted into looped portions thereof.

10. Child protecting clothes for vehicles according to claim 9, wherein length regulatable height regulators are provided directly or indirectly on the portions of the vertical reinforcing belts which correspond to an upper portion of the front member.

11. Child protecting clothes for vehicles according to claim 9, wherein each of the crotch belts has a belt type pad member additionally provided in an inserted state via slits formed in the pad member, the belt type pad member being provided at one end portion thereof with projecting members extending in two laterally opposite directions, the projecting members being folded onto a buckle to hold the buckle in a buckle-enclosing state.

12. Child protecting clothes for vehicles according to claim 1 or 9, wherein each of the crotch belts has a belt type pad member additionally provided in an inserted state via slits formed in the pad member, the belt type pad member being provided at one end portion thereof with projecting members extending in two laterally opposite directions, the projecting members being folded onto a buckle to hold the buckle in a buckle-enclosing state.

13. Child protection clothes for vehicles which a child sitting on a seat of an automobile via a child seat having a slit through which a seatbelt is inserted wears, the child protecting clothes including a front member and a back member that together form a head opening and waist opening, characterized in that the back member of the child protecting clothes has a double layer portion comprising an inner cloth portion and an outer cloth portion, the inner and outer cloth portion forming a pair of openings adjacent distal ends of the back member with the openings extending generally vertically from adjacent the waist opening to either a midsection of the outer cloth portion or adjacent the head opening, the openings formed by the inner and outer cloth portions receives a seatbelt.

* * * * *